United States Patent
Hodges et al.

(10) Patent No.: US 7,800,251 B2
(45) Date of Patent: Sep. 21, 2010

(54) SYSTEM AND METHOD FOR LOAD CONTROL

(75) Inventors: Joseph W. Hodges, Bloomfield Hills, MI (US); John A. Sopuch, Sylvan Lake, MI (US)

(73) Assignee: Hammerhead International, LLC, Bingham Farms, MI (US)

( * ) Notice: Subject to any disclaimer, the term of this patent is extended or adjusted under 35 U.S.C. 154(b) by 0 days.

(21) Appl. No.: 11/875,554

(22) Filed: Oct. 19, 2007

(65) Prior Publication Data

US 2009/0102294 A1    Apr. 23, 2009

Related U.S. Application Data

(60) Provisional application No. 60/980,987, filed on Oct. 18, 2007.

(51) Int. Cl.
H02J 13/00    (2006.01)
(52) U.S. Cl. .................................... 307/126; 340/656
(58) Field of Classification Search ............... 307/125, 307/126, 130, 140, 38–41; 340/654–656
See application file for complete search history.

(56) References Cited

U.S. PATENT DOCUMENTS

| | | | |
|---|---|---|---|
| 4,558,310 A | | 12/1985 | McAllise |
| 4,947,278 A | | 8/1990 | Nichols, III |
| 5,760,491 A | * | 6/1998 | Kalin ........................... 307/17 |
| 6,028,373 A | * | 2/2000 | Kim et al. ..................... 307/38 |
| 6,038,115 A | | 3/2000 | Kleemeier et al. |
| 6,496,390 B2 | | 12/2002 | Yang |
| 6,552,888 B2 | | 4/2003 | Weinberger |
| 6,961,856 B1 | | 11/2005 | Kouropoulos |
| 7,257,466 B2 | | 8/2007 | Kreiner |
| 7,411,317 B2 | * | 8/2008 | Liu ........................... 307/112 |
| 2005/0111154 A1 | | 5/2005 | Baughan |
| 2006/0095164 A1 | | 5/2006 | Donnelly et al. |
| 2006/0181817 A1 | | 8/2006 | Ohana et al. |
| 2006/0273663 A1 | * | 12/2006 | Emalfarb ..................... 307/126 |
| 2007/0070558 A1 | | 3/2007 | Liu |
| 2007/0086126 A1 | | 4/2007 | Baxter |

FOREIGN PATENT DOCUMENTS

| | | |
|---|---|---|
| KR | 1020040096405 | 11/2004 |
| KR | 20-0392807 Y1 | 8/2005 |
| KR | 200392807 | 8/2005 |

OTHER PUBLICATIONS

International Preliminary Report on Patentability dated Apr. 29, 2010 relating to International Application No. PCT/US2008/077065.

* cited by examiner

*Primary Examiner*—Fritz M Fleming
(74) *Attorney, Agent, or Firm*—Honigman Miller Schwartz and Cohn LLP

(57) ABSTRACT

A system is described including a means for receiving a potential and selectively supplying the potential to a load. The receiving and supplying means being responsive to a load control signal to supply the potential to the load when the load control signal is present. The system also includes a means for measuring a load demand. Also included is a means for controlling the receiving and supplying means. The controlling means continuously providing the load control signal when the load demand is greater than a predetermined threshold. The controlling means temporarily providing the load control signal to determine the load demand when the load demand is less than the predetermined threshold.

6 Claims, 7 Drawing Sheets

SYSTEM AND METHOD FOR LOAD CONTROL

CROSS REFERENCE TO RELATED APPLICATION

This application is based on, and claims priority under 35 U.S.C. §119(e) to U.S. Provisional Patent Application No. 60/980,987 filed on Oct. 18, 2007, titled "SYSTEM AND METHOD FOR LOAD CONTROL", to Joseph W. Hodges et al., and which is incorporated herein by reference.

TECHNICAL FIELD

The embodiments described herein are generally directed to control of an electrical load.

BACKGROUND

Many electrical devices that utilize a plug-in power source (e.g., household power connection) consume energy while switched off and not in use. This is primarily due to a transformer or power supply that remains connected to the power source even during periods of inactivity. One common method of powering these electrical devices includes a step-down transformer with a regulator. Common examples of such devices include mobile phone chargers, VCRs, televisions, stereos, computers, and kitchen appliances.

The devices that remain powered waste energy through their transformers and/or power supplies that remain connected to the power source. Such power loss is commonly referred to as a phantom power load because the power consumption does not serve a purpose. The electrical device or appliance is typically in a standby state or otherwise inactive when drawing current and is not serving a useful function. In aggregate, a large number of phantom loads contribute to a significant portion of essentially wasted power.

One method of preventing a phantom load is to physically unplug an appliance from the electrical outlet when it is not in use. This completely disconnects the appliance from the power source and eliminates phantom loading. However, the user then must manually plug in the load when load-use is desired and then unplug the load when use is no longer desired. Such ongoing plugging-in and unplugging may be a time consuming task as well as increase wear and tear on the electrical outlet, plug, and wiring to the load.

Consequently, there is a need to reduce the amount of power consumption from loads that are not in use to reduce energy waste. More generally, there is a need to selectively control a load based on the behavior of the load itself.

BRIEF DESCRIPTION OF THE DRAWINGS

The features and inventive aspects will become more apparent upon reading the following detailed description, claims, and drawings, of which the following is a brief description:

DETAILED DESCRIPTION

Figure 1:
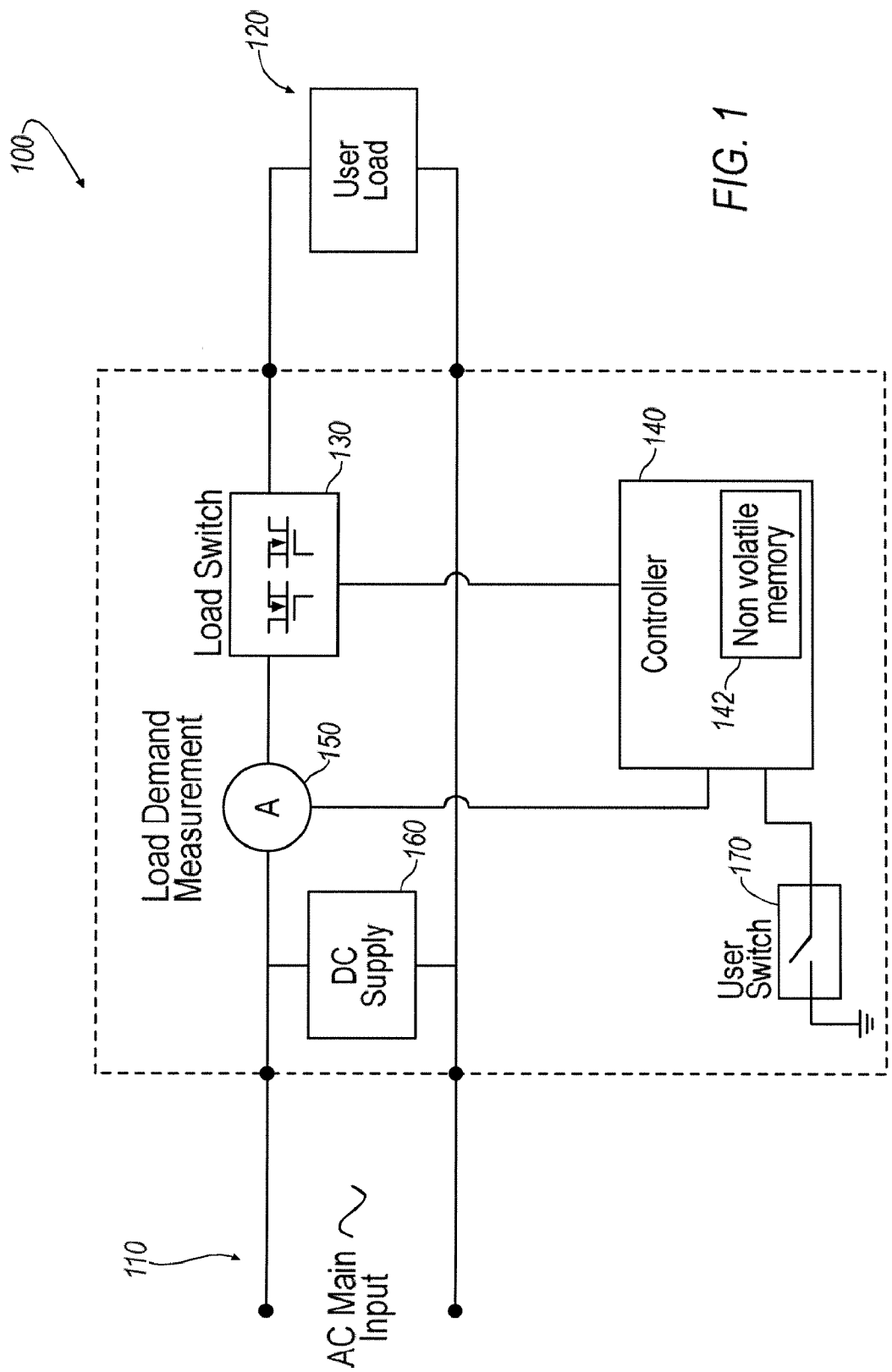
FIG. 1 is a block diagram of an energy saving device.

Referring now to the drawings, illustrative embodiments are shown in detail. Although the drawings represent the embodiments, the drawings are not necessarily to scale and certain features may be exaggerated to better illustrate and explain novel aspects of an embodiment. Further, the embodiments described herein are not intended to be exhaustive or otherwise limit or restrict the claims to the precise form and configuration shown in the drawings and disclosed in the following detailed description.

An example of a device including a system and method of load control may be an energy saving device that removes power to a load when the load is not performing a useful function. In this way, phantom load power is reduced. When the load is performing a useful function, power is supplied normally until a phantom load is detected, at which time the load is disconnected from the power source. One example of such a load is a household appliance that may not serve a useful purpose when a user does not require it to function, for example a television or a phone charger. When a television is not turned on, it is still drawing a phantom load current to power the internal transformer and/or power supply circuitry. However, the energy saving device discussed herein would interrupt the television's power input when the television is not in use. This interruption of the power input substantially eliminates the phantom load because the transformer or power supply electronics of the television are substantially un-powered and not drawing current.

An example of an energy saving device may include a measurement means, a switch means, and a logic means. The measurement means may be configured to detect current or power flowing to a load from a power source. The switch means may selectively connect and disconnect the load from the power source. The logic means determines when to connect and disconnect the load from the power source. In one example, the logic means determines whether the load is "active" or "inactive" depending upon the current or power consumption as read by the measurement means.

The logic means determines the state of the load by measuring the current that the load consumes. To make a determination whether the load is "active" or "inactive", the logic means compares the current the load is consuming to a threshold. The threshold may be predetermined value or it may be determined after the energy saving device is connected to the load (e.g., using a learning mode to define and/or characterize the load power usage). When the energy saving device uses a modifiable threshold, the value may be tuned for each load connected thereto. Such an adaptive system may be used where a large number of different loads could be connected to a single type of energy saving device. For example, household appliances may consume a wide variety of power in the "active" and "inactive" states depending upon the particular appliance (e.g., a television, a radio, a phone charger) and/or circuit design used therein. The energy saving device may then adapt to the attached load.

Each load may have a preferred threshold that the logic means uses to determine "active" and "inactive" states. This threshold may be determined by the energy saving device for each load connected to it and thus, an adaptable system may be used to allow for a variety of loads to be switched by a single variety of energy saving devices. One method of adaptive learning of the threshold includes recording current usage over a predetermined time (e.g., 24 hours). In the learning mode, the load is maintained in a fully powered state so that the logic means can record the power usage. When the predetermined learning time has elapsed, a threshold can be set between the minimum and maximum currents recorded during the learning mode. If no variation or minimal variation is noted in the recoded current measurement data, then a default threshold may be used.

Once the threshold is saved, the energy saving device logic means momentarily turns the load on to measure the current consumption. The logic means then compares the current consumption with the threshold. If the current consumption is greater than the threshold, the logic means deems the load in the "active" state and maintains power to the load. If the current consumption is less than the threshold, the logic means deems the load in the "inactive" state and power to the load is switched off. If the load is in the inactive state, the logic means occasionally (e.g., periodically) powers the load and repeats the above test to determine the desired power state of the load as a function of the load's demand behavior.

By disconnecting the load from the power source when the load is inactive, the amount of phantom current is reduced. Energy conservation is realized when the load is disconnected from the power source during times of inactivity. Power may be supplied to the load at predetermined intervals (e.g., approximately 400 ms every 2 seconds) to check the load state. This may be called the "power duty cycle" which indicates how often and for how long the load is powered for checking the active/inactive state. The power duty cycle may be determined at the point of manufacture (e.g., stored in non-volatile memory) or it may be adaptable depending upon the load (and optionally a user input such as a pushbutton).

In general, during "power cycling" the energy conservation device measures current consumption at times when power is applied to the load. If the current consumed by the load is above the threshold, the load is deemed in a "power on request" state. In this case, power cycling stops and power is applied to the load continuously. This is the normal "on" operating state of the load, and power is not cycled. During the normal operating state of the load, supplied current is monitored continuously. If the current is measured below the threshold, the load is determined to have changed to the standby state. In this event, the power cycling condition resumes to conserve energy once again.

Generally discussed herein is a system that includes a means for receiving a potential and selectively supplying said potential to a load. This receiving and supplying means may be configured as a switching element that receives a voltage from a power source, such as from a standard power receptacle as is found in a house or other structures. The receiving and supplying means is also responsive to a load control signal to supply said potential to the load when the load control signal is present. The system also includes a means for measuring a load demand where the load demand may include a current, voltage, power, or other measurement of load activity, power demand, or consumption. The system may further include a means for controlling the receiving and supplying means. The controlling means continuously providing the load control signal when the load demand is greater than a predetermined threshold. The controlling means may also temporarily provide the load control signal to determine the load demand when the load demand is less than the predetermined threshold.

Another example as discussed herein is an electrical device that includes a switch responsive to a switching signal. The switch has a input for receiving power and an output for connection to a load. A sensor may measure an electrical demand to the load which may include a current, voltage, power, or other measurement of load activity, power demand, or consumption. A controller selectively provides the switching signal. The controller provides the switching signal to power the load when the electrical demand is greater than a predetermined threshold. The controller momentarily providing the switching signal to power the load after a delay to determine the electrical demand after the delay.

Also discussed herein is a method for controlling an electrical load. The method includes determining a load demand. The load demand may include a current, voltage, power, or other measurement of load activity, power demand, or consumption. The method further includes provisioning power to the load when the load demand is greater than a first threshold 430a. The method also includes removing power to the load when the load demand is less than a second threshold 430b.

FIG. 1 is an example block diagram of an energy saving device 100. A pair of Inputs 110 are configured for receiving a voltage from a power source. A load 120 is connected to outputs that are selectively switched to inputs 110 by a load switch 130. A controller 140 uses an activation signal to load switch 130 to selectively supply power to load 120 from inputs 110. Controller 140 may base the activation signal on a number of inputs, including a load sensor 150 and/or a user switch 170. Additionally, controller 140 may include a memory 142 that provides for non-volatile storage of operating parameters of energy saving device 100.

In an example, inputs 110 may be configured to interface with typical power infrastructures that may include standardized power distribution systems. One example includes the United States' standard "household power" that operates at around 120 volts AC at 60 Hz. Alternatively, other voltages and frequencies may be used including typical 220 volts at 50 Hz or 60 Hz. Indeed, energy saving device 100 should not be limited to household-type electrical connections, as it may also be employed in a variety of circumstances including mobile loads, industrial, automotive, etc. For example, energy saving device 100 may be applied to 120 volts AC at 60 Hz, 220 volts AC at 60 Hz, 220 volts AC at 50 Hz, 480 volts AC, 660 volts etc. Thus, energy saving device 100 may be adapted for use with power infrastructures around the world (both in voltage and in frequency), including but not limited to, household, industrial, mobile equipment, etc. Other examples may include applications such as aircraft, motor yachts, mobile homes, and automobiles, etc., where power for non-essential electrical systems and devices (e.g., infotainment or communications systems for passengers) may not require constant powering. Thus, in power-conscious applications energy saving device 100 may generally reduce the steady-state load on the power systems which may reduce operating costs, equipment costs, and/or maintenance costs.

As shown herein, a power supply 160 provides power for the operation of controller 140 and the associated electronics such as load sensor 150 and load switch 130. Power supply 160 may be configured so that energy is not wasted in the powering of controller 140. In another example, power supply 160 may include a battery that is rechargeable and/or user replaceable. Such a battery configuration would not necessitate power drawn from inputs 110 to provide power to energy saving device 100.

Load sensor 150 may include a current measurement sensing topology that may include a high-side resistive differential amplifier (explained below in detail with respect to FIG. 2). Such a system typically implements a resistor in series between inputs 110 and load 120 such that the voltage drop across the series resistor is measured to determine current flowing to load 120. The measured current to load 120 may be sent to controller 140 at an analog to digital converter (ADC) input or an analog comparator input. Alternative implementations may include a hall-effect sensor to measure current directly flowing from inputs 110 to load 120. In yet another example, a current measurement system may be integral with load switch 130 (such as a sense-FET). Moreover, power measurements or other means may be employed to determine whether load 120 is in use.

In operation, controller 140 may occasionally power load 120 to determine whether load 120 is to be activated continuously. If load 120 demands a relatively large current (e.g., as detected by load sensor 150), then load 120 is allowed to remain powered by continued activation of load switch 130. If load 120 demands a relatively small current, then load 120 is deactivated by turning off load switch 130. In this way, controller 140 uses load sensor 150 to determine the active or inactive status of load 120. By not continuously powering load 120, a power savings is realized through the momentary powering scheme when load 120 is turned off and not demanding a relatively large current.

User switch 170 may be used to override the operation of controller 140 to power the load based on a user request. For example, if the user believes that energy saving device 100 should power load 120, user switch 170 may be activated to immediately power load 120. User switch 170 may also be used by controller 140 as a training input. For example, if the user connects an arbitrary load to energy saving device 100 with different characteristics than the previously trained load 120, then the user may press user switch 170 to activate load 120 and signal to controller 140 that a training mode should be re-entered (explained below in detail with respect to FIG. 3).

Memory 142 may be embodied as a Flash memory, an Electrically Erasable Programmable Read-Only Memory (EEPROM) memory, or other non-volatile memory that retains information when un-powered. Typical information stored in memory 142 may include statistical information related to the operation of load 120 based on measurements from load sensor 150. Alternatively, memory 142 may include general parameter information that defines operational characteristics of controller 140.

In general, the block diagram shown herein is not to be interpreted as the only example of how to configure energy saving device 100. Indeed, in some circumstances, controller 140 may be replaced by sequential logic circuitry, analog circuitry, or a combination of both. Moreover, as is known to those skilled in the art, measurement of load 120 using load sensor 150 may include current, voltage, or power measurements depending upon the configuration. Thus, the current measurement technique for determining load consumption as discussed herein is not the only means to measure load activity and load demand. Similarly, load switch 130 may be configured using variations of components such as a field-effect transistor (FET), Triode for Alternating Current (TRIAC), zero-crossing switches, or other switching means to control load 120.

Figure 2:
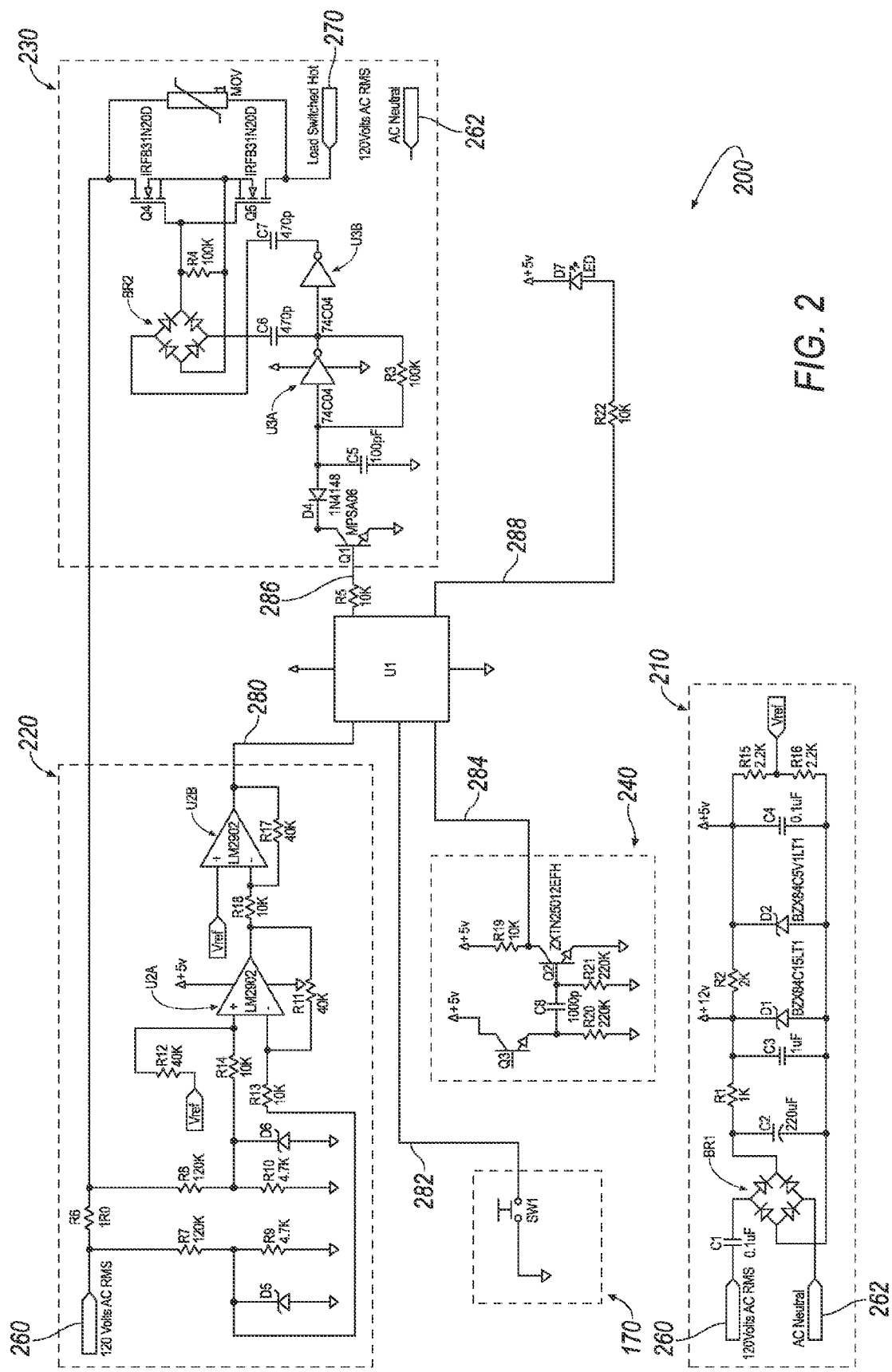
FIG. 2 is a schematic of an example of the energy saving device of FIG. 1.

FIG. 2 is a schematic of an example of an energy saving device 200. A power supply block 210 is connected to a power input 260 and a common terminal 262. A sensor block 220 measures the load current and a load switch block 230 generally controls the flow of power from power input 260 to a load output 270. Load output 270 may be directly attached to the power input to load 120 (shown in FIG. 1). While not necessary for operation, user switch 170 provides for immediate activation of a load. Moreover, an infrared sensor block 240 may be used to determine the operation of a user remote control, which requests immediate powering the load. This is used, for example, when a remote control is used to turn on a television. In this example, infrared sensor block 240 detects use of the remote and then the logic immediately turns on the television.

Power supply block 210 includes a capacitive power supply topology for low power operation. Power supply block 210 regulates a dual voltage supply to about 12 volts and about 5 volts. A bridge rectifier BR1 is used to rectify the alternating current (AC) from power input 260 and common terminal 262. Zener diodes (D1, D2) and a capacitor network (C2, C3, C4) generally regulate the voltage. In addition to supplying power to energy saving device 200, power supply block 210 also provides a voltage reference (Vref) for use with the current detection circuitry.

Sensor block 220 includes a series resistor R6 that is configured as a low-value resistor with a high power rating. For example, series resistor R6 may be a one-ohm resistor rated for 200 watts of power. A differential amplifier configuration is used that includes U2A, U2B, and Vref (from power supply block 210) to measure the current flowing through series resistor R6 to a load connected to load output 270. A load signal 280 is provided to controller U1 that contains control logic for operating load switch block 230. Controller U1 may be configured to receive load signal 280 at an analog to digital converter (ADC) input to convert the analog signal to a numeric value. In general, load signal 280 indicates to controller U1 the amount of current or power being consumed/demanded by the electrical load connected to load output 270. The load consumed by the circuitry described in the schematic of FIG. 2 does not draw power through sense resistor R6. Thus, any power consumed by the circuitry shown herein is not included in the load demand value indicated by load signal 280.

Although shown herein as a single-range sensing scheme with a single output of load signal 280, sensor block 220 may also include multiple ranges of sensed current. For example, a second load signal (not shown) may be measured by controller U1 provided by a signal at the output of amplifier U2A. Thus, controller U1 would then be able to detect current over two ranges provided by the outputs of both U2A and U2B, which would be connected to separate ADC inputs of U1. Alternative examples may also include a low-side measurement scheme or a Hall-effect load measurement scheme.

Figure 3:
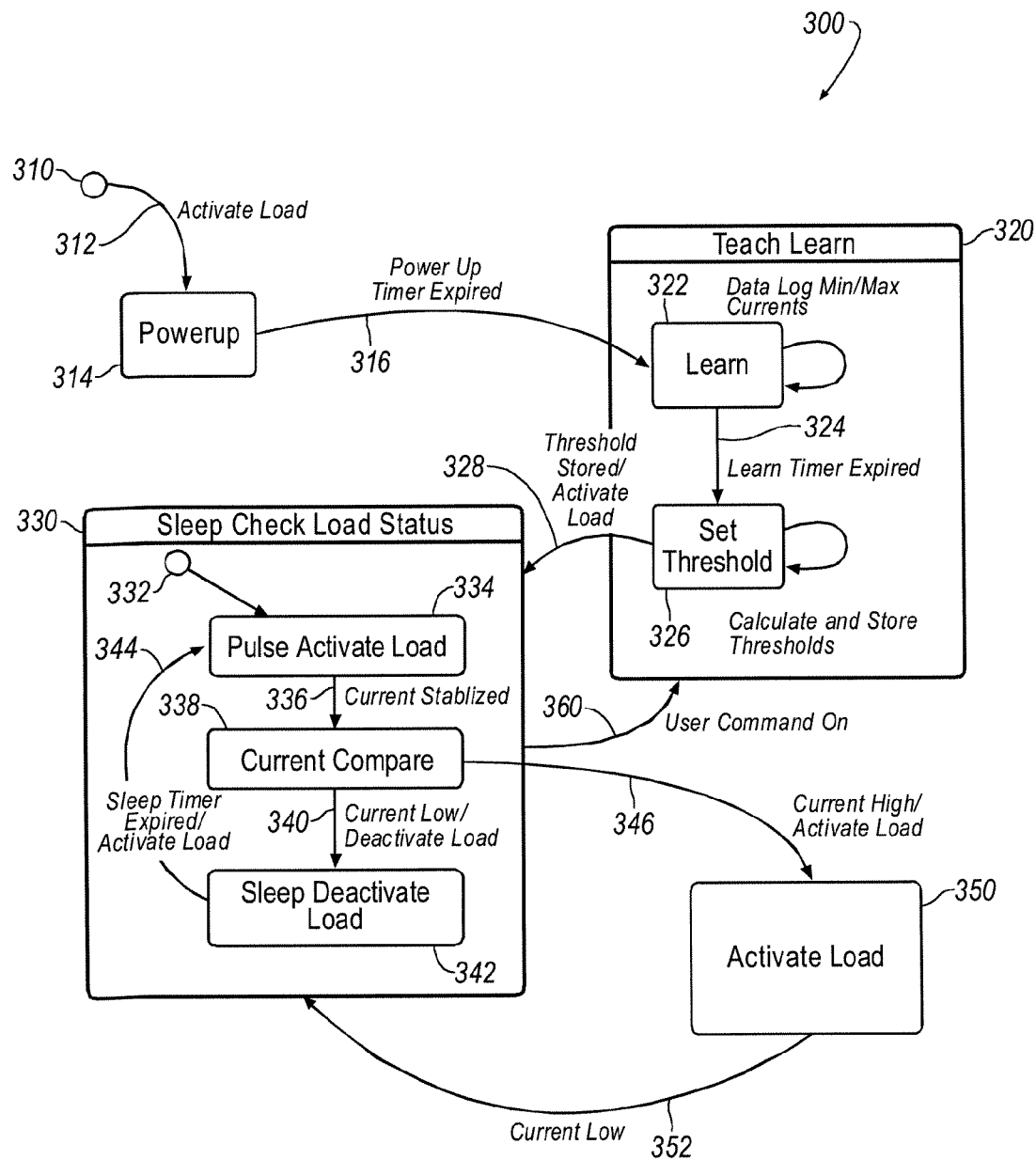
FIG. 3 is a state transition diagram for use with the energy saving device of FIG. 2.

Controller U1, in an example, may be configured as a micro-controller capable of performing the actions detailed in FIG. 3. Examples of micro-controllers known to those skilled in the art may include, for example, PIC™ micro-controllers from Microchip™, or AVR™ micro-controllers from Atmel™. For compact designs, the example shown herein includes a relatively small device that may have eight pins. However, energy saving device 200 may include other features not detailed herein, including radio frequency reception for further intelligent control of a load. Moreover, micro-controller U1 may control more than one load based on a single sensor block 220, or more than one sensor block 220. Thus, controller U1 may be scaled up or down in capabilities depending upon the measurement and control requirements for a particular application.

Load switch block 230 includes a FET driver circuit for controlling power to a load connected to load output 270. The load (as shown in FIG. 1 as load 120) is electrically connected to load output 270 and common terminal 262. A load control signal 286 is provided by controller U1 to control load switch block 230. Load switch block 230 activates (powers) or deactivates (disconnects) a load (e.g., a device or appliance) connected to load output 270. Load switch block 230 generally includes a charge pump, including U3A and U3B, that drives a bridge rectifier BR2 that in turn drives FETs Q4 and Q5. A Metal Oxide Varistor (MOV) is included to protect the relatively sensitive FETs Q4 and Q5 when the load connected at load output 270 is switched off. The MOV may also perform a secondary function as a surge suppressor for potentially damaging signals present at power input 260.

An additional feature may include a user output signal 288 from controller U1 that switches a LED D7. Output signal 288 may be used to indicate an operating status (e.g., load on or off) of energy saving device 200 to the user. Alternatively, output signal 288 may indicate that energy saving device 200 is in a learning mode (discussed below in detail with respect to FIG. 3) or whether an abnormal load condition exists that may require turning off the load to preserve the electronics.

Other examples of inputs that may trigger controller 140 to turn on load 120 (similar to infrared sensor block 240 and user switch 170) may include a general radio frequency input, a network input (such as a LAN or WiFi), digital information transmitted over the power line at power input 260, and/or signals designed for intelligent control of electrical devices, etc. Sensor block 240 may include an infrared transistor Q3 and a transistor Q2, resitors R20, R21, R19, and capacitor C8 may be used to determine whether infrared events are occurring. In general, sensor block 220 includes circuitry for measuring the current passing through resistor R6. For example, resistors R7, R8, R13 and diode D5 form a first input to amplifier U2A. Resistors R8, R10, R14, R12 and Diode D6 provide for a second input to amplifier U2A. Resistors R11, R18, and R17 are configured with U12A and U2B to form a differential amplifier. Resistor R5 provides a load control signal 286 that controls transistor Q1. Transistor Q1 in turn sends a signal through Diode D4 to control a charge pump configured with C5, R3, C6 and C7 together with inverters U3A and U3B. Bridge rectifier BR2 and resistor R4 control FETs Q4 and Q5 that are protected by MOV1. Resistor R22 is used as a current limiting resistor for LED D7. Switch 170/SW1 serves as an optional user input via signal 282 to controller U1. Power supply block 210 includes an input capacitor C1 and a bridge rectifier BR1. After rectification, the power supply block provides a 12V and 5V supply as well as a voltage reference Vref for the sensor block 220. The voltages are produced by the arrangement of Capacitors C2, C3, C4, resistors R1, R2, and Zener diodes D1, D2. Vref is provided by a voltage divider configured by resistors R15, R16.

FIG. 3 is a state transition diagram 300 for use with energy saving device 200 of FIG. 2. Initial entry point 310 leads to an activate load transition 312. A typical event for energy saving device 100 to enter initial entry point 310 is when the unit is plugged into a power source. A power up mode 314 is then entered where the load is powered for a predetermined delay time. Typically, a timer/counter is used in conjunction with controller 140 (see FIG. 1). When the delay has elapsed, a power up timer expired transition 316 transfers to a teach/learn state 320.

Initial entry to teach/learn state 320 transitions to a learn state 322 where controller 140 measures the current (electrical demand) used by the load over a predetermined amount of time. Here, controller 140 determines the behavior of the load over a number of on and off cycles. By examining the load behavior, the controller may determine when the load is in use by the pattern of "load active" current consumption and "load inactive" current consumption (explained in detail below with respect to FIG. 4).

Controller 140 remains in learn state 322 until a learn timer expired transition 324 transfers control to a set threshold state 326. Controller 140 then calculates an appropriate threshold to distinguish the load "active" and "inactive" states. When the threshold has been determined, a threshold stored/activate load transition 288 transfers control to a sleep check load status state 330. Threshold stored/activate load transition 288 generally indicates that the threshold has been stored in memory (which may include a non-volatile memory such as memory 142 of FIG. 1).

Alternatively, the threshold may be a hard-coded value placed in non-volatile memory during manufacturing. Another alternative may provide a table of hard-coded threshold values. If the threshold does not suit the particular load connected, the user may push user switch 170 (shown in FIG. 1) to indicate to the controller that the current threshold is not functioning as desired. The controller may then select another threshold value from the table using, for example, a bisection algorithm to locate the appropriate threshold value for the load to reduce required user interaction.

Sleep check load status state 330 has an initial entry point 332 which immediately transfers control to a pulse activate load state 334. Pulse activate load state 334 activates the load and waits for a predetermined time for the current signal to stabilize. A current stabilized transition 336 transfers control to a current compare state 338 where the current measured through the load is compared to the threshold determined in set threshold state 326. If the current measured through the load is greater than the threshold, a current high activate load transition 346 transfers control to an activate load state 350.

Alternatively, if the current measured through the load is less than the threshold, a current low deactivate load transition 340 transfers control to a sleep deactivate load state 342 where the load is deactivated. In sleep deactivate load state 342, a timer may be monitored to determine when a predetermined sleep time has elapsed. When the predetermined sleep time has elapsed, a sleep timer expired activate load transition 344 transfers control back to pulse activate load state 334. As can be determined from sleep check load status state 330, the controller may repeat a cycle where the load is measured for significant use or insignificant use. When a current is measured that is greater than the threshold, the load is turned on. Similarly, when a current is measured that is less than the threshold, the load is turned off. Also noted is that controller 140 may include hysteresis for the threshold value in the on-to-off and off-to-on transitions to avoid oscillation and/or undesirable activation and deactivation.

In activate load state 350, the controller monitors the current for a transition to a low current consumption state of the load. When a current is measured less than the threshold determined in set threshold state 326, then current is turned off to the load. A current low transition 352 is then triggered and control proceeds to entry point 332 and pulse activate load state 334.

Figure 4:
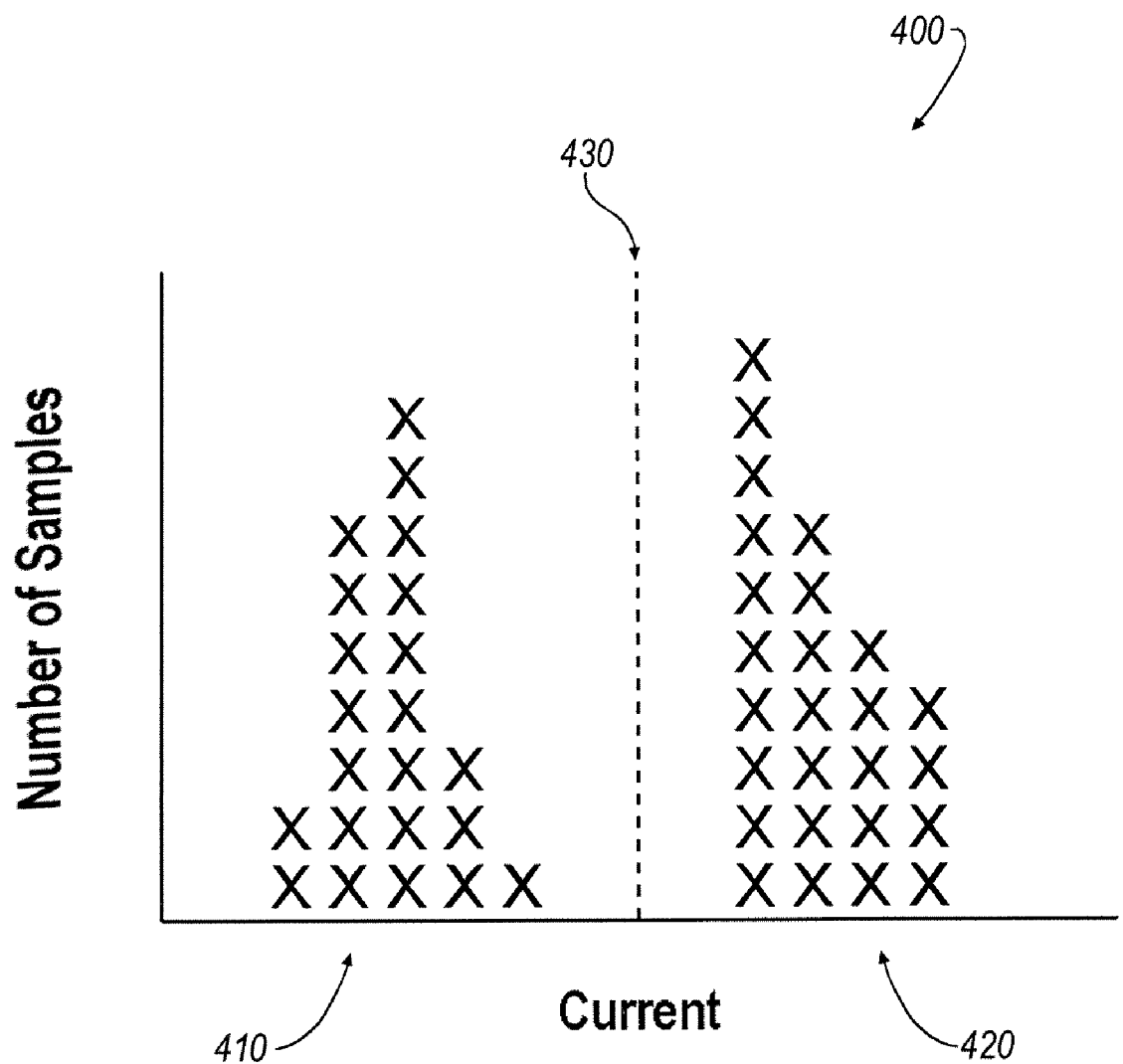
FIG. 4 is a histogram classification graph for determining active and inactive states of the load of FIGS. 1 and 2.

FIG. 4 is an example of a histogram classification graph 400 for determining active and inactive states of load 120 of FIGS. 1 and 2. During learn state 322 of teach/learn state 320 (described in detail with respect to FIG. 3), the controller monitors the usage of the load to collect information. As shown in the chart, current magnitude is measured over time to develop two distinct regions. On the right hand side of the chart, an active state 420 is indicated by a large number of samples. Similarly, a large number of samples on the left hand side of the chart indicate an inactive state 410. When the controller has collected enough information, or a timer has expired, then the microcontroller transfers control to set threshold state 326.

A threshold 430 may be determined in a number of manners. However, many loads exhibit dramatic differences in load demand behavior when inactive and active. Thus, for many applications the simple classification problem of the active and inactive states is solved by determining the average difference between clusters of measurements. These clusters of measured current, in this example, are shown by the two distinct measured current regions for inactive state 410 and active state 420. Although not shown, threshold 430 may include hysteresis that would substantially prevent undesirable switching of the load. The threshold 430 may include a first predetermined threshold 430a and a second predetermined threshold 430b. The use of two thresholds provides hysteresis as discussed above, for example, to reduce the risk of oscillation.

Figure 5:
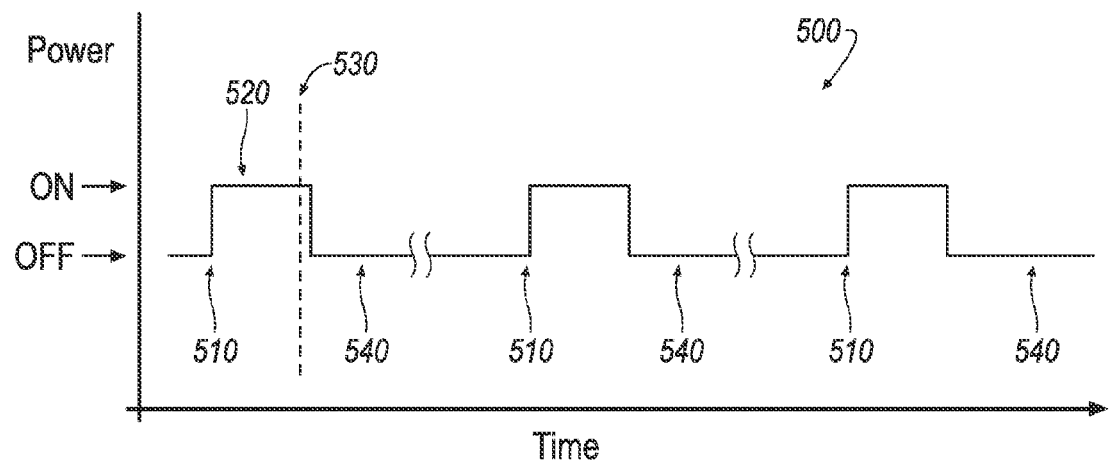
FIG. 5 is a timing diagram for activation of the load of FIGS. 1 and 2.

FIG. 5 is a timing diagram 500 for activation of load 120 of FIGS. 1 and 2. Timing diagram 500 generally refers to the sequence of applying power and removing power during sleep check load status state 330 of FIG. 3. At an activation time 510, load 120 (of FIG. 1) is provided power based on sleep timer expired activate load transition 344 to pulse activate load state 334 of FIG. 3.

A load activation time 520 allows controller 140 to determine whether load 120 is desired to be fully powered. In general, load activation time 520 includes the logic processes of current stabilized transition 336 and current compare state 338 of FIG. 3. A decision time 530 indicates that controller 140 is testing the current measured by load sensor 150 (of FIG. 1) against threshold 430 (of FIG. 4). At decision time 530, load 120 is deactivated because the current measured is less than threshold 430. Load 120 is then deactivated during an inactive time 540. Further repetitions of activation time 510 and inactive time 540 demonstrate that load 120 is continuously demanding current less than threshold 430. Although timing diagram 500 shows a periodic interval for activation time 510 and inactive time 540, it is also possible to configure each timing sequence with a non-periodic time such that some activations and/or deactivations are not equally spaced in time. For example, if the current measured is close to threshold 430, controller 140 may reduce the time between checking for activation and deactivation in an attempt to more closely monitor load demand.

Figure 6:
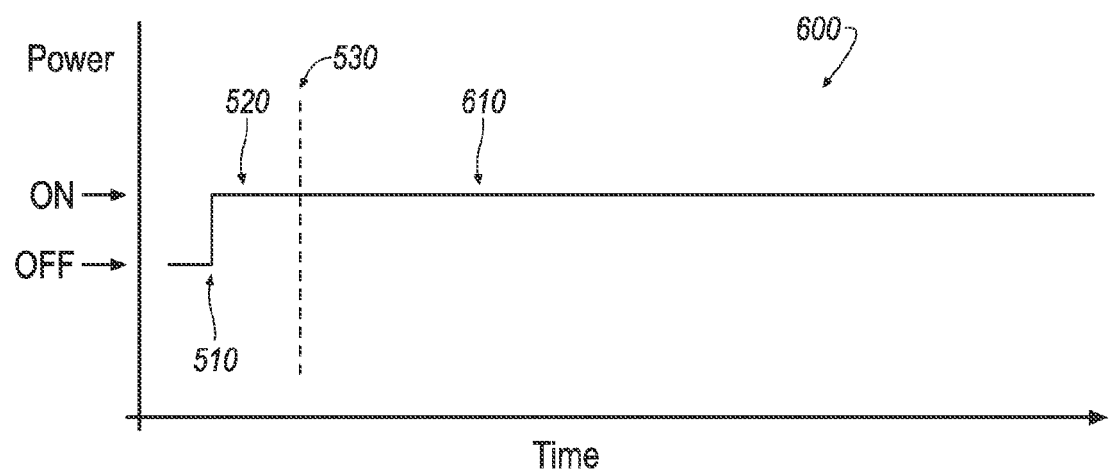
FIG. 6 is a timing diagram for sensing and switching on the load of FIGS. 1 and 2.

FIG. 6 is a timing diagram 600 for sensing and switching load 120 of FIGS. 1 and 2. In this example, activation time 510 powers load 120 for a load activation time 520. Then, at decision time 530 it is determined that load 120 is consuming a current greater than threshold 430. After the determination (corresponding to current high activate load transition 346 of FIG. 3), load 120 remains active for a load active time 610 that includes activate load state 350. Load 120 will remain active until a current low transition 352 is triggered by the current to load 120 dropping below threshold 430 (not shown in FIG. 6).

Figure 7:
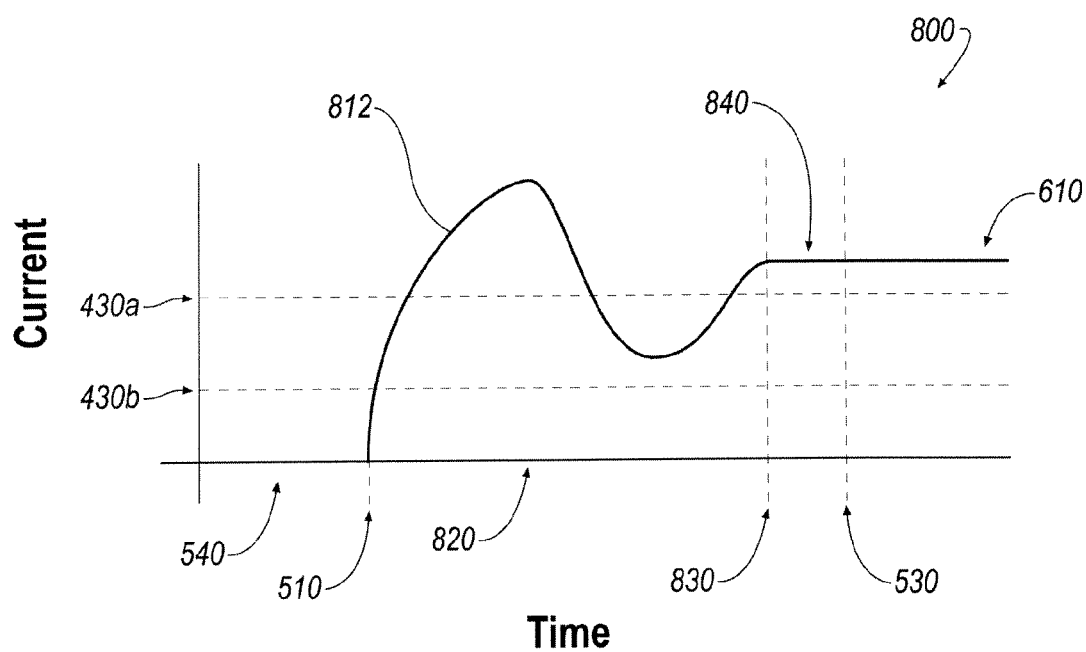
FIG. 7 is a current vs. time chart of load sensing when the load is active.

FIG. 7 is a current vs. time chart 800 of load sensing when load 120 is active. In this example, the current as measured by load sensor 150 (shown in FIG. 1) is shown in an analog chart form. At inactive time 540 (shown in FIG. 5) substantially no current is flowing to load 120. However, at activation time 510, a ramp up of current 812 indicates that load 120 is demanding current flow. During a stabilization period 820, the current flow may oscillate or otherwise behave unpredictably due to the unknown nature of load 120. It is during stabilization period 820 that load 120 receives full power to initialize the systems (if logic based) or otherwise transition to a fully powered state. At a stabilization end time 830, a sampling window 840 is used to sample the load current. At this time, one or more samples are taken from load sensor 150 to determine whether load 120 is drawing more current than threshold 430. As shown at decision time 530, load 120 remains active because the current to load 120 is greater than threshold 430. Therefore, load 120 remains active for load active time 610.

Figure 8:
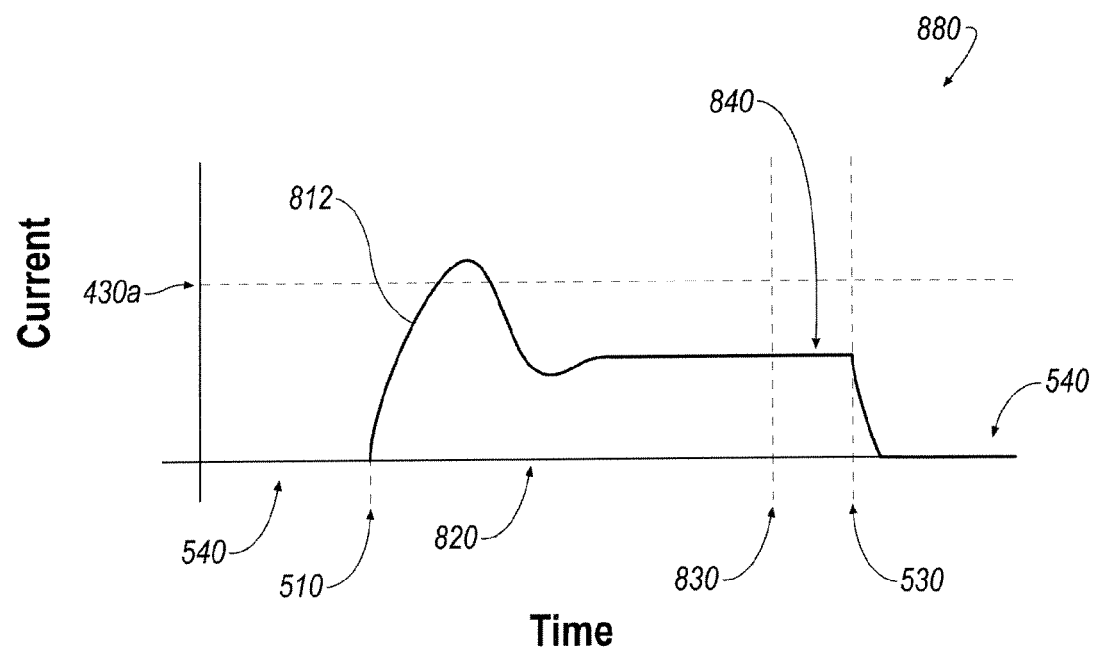
FIG. 8 is a current vs. time chart of load sensing when the load is inactive.

FIG. 8 is a current vs. time chart 880 of load sensing when load 120 is inactive. Here, the current as measured by load sensor 150 (shown in FIG. 1) is shown in an analog chart form with a slightly higher zoom factor when compared with FIG. 7 (although the figures are not to scale). At inactive time 540 (shown in FIG. 5), substantially no current is flowing to load 120. At activation time 510, a ramp up of current 812 indicates that load 120 is demanding current flow. During a stabilization period 820, the current flow oscillates but does not oscillate to the extent as shown in FIG. 7. At a stabilization end time 830, sampling window 840 is used to sample the load current. At decision time 530, load 120 is deactivated because the current demand is less than threshold 430. Load 120 will remain inactive for inactive time 540 until the next activation time 510 or a user activation.

Figure 9:
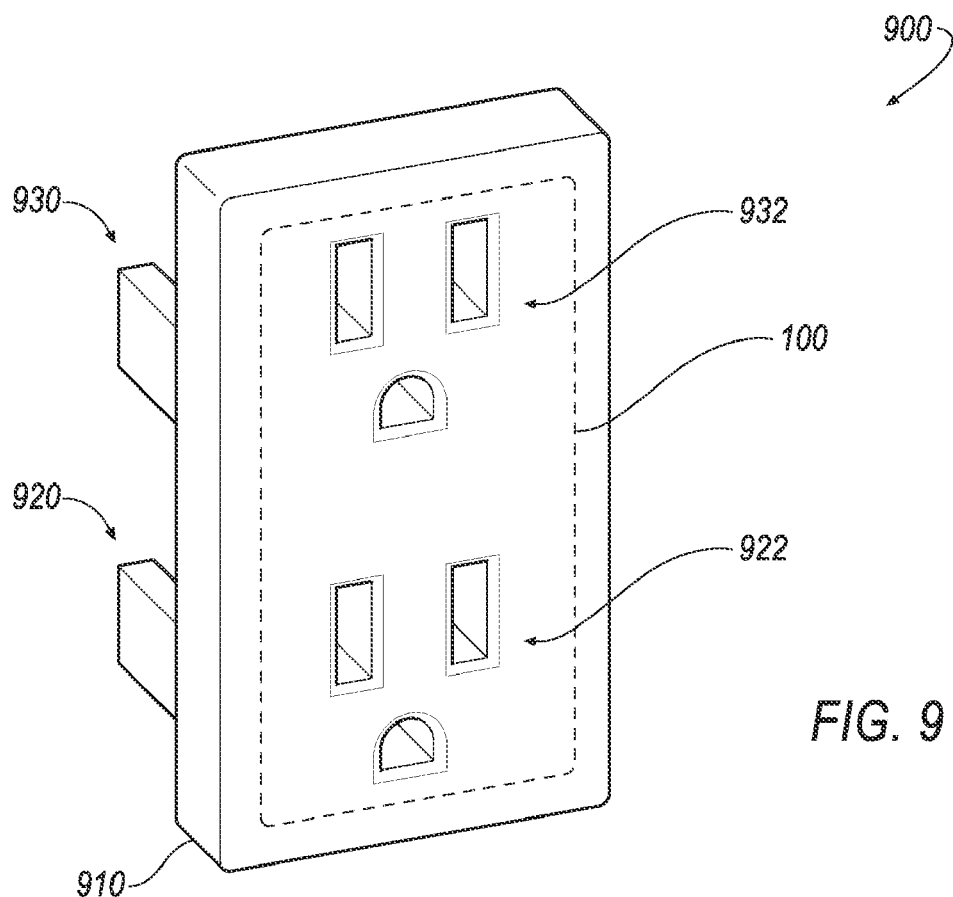
FIG. 9 is an example of a wall outlet alternative energy saving device.

FIG. 9 is an example of a wall outlet alternative energy saving device 900. The example here shows a stylized packaging alternative for the energy saving device 100 of FIG. 1. In use, a user may plug device 900 into a standard dual outlet where power pins 920, 930 connect with the receptacle and hold device 900 in place. Device 900 may be encased in a housing 910 and includes two receptacles 922, 932 for the user to plug in loads. Here, energy saving device 100 is employed as a user installable device for retro-fitting existing receptacles. In this example, power pins 920 map to inputs 110 (see FIG. 1) and receptacle 932 maps to where load 120 (see FIG. 1) is plugged in.

Figure 10:
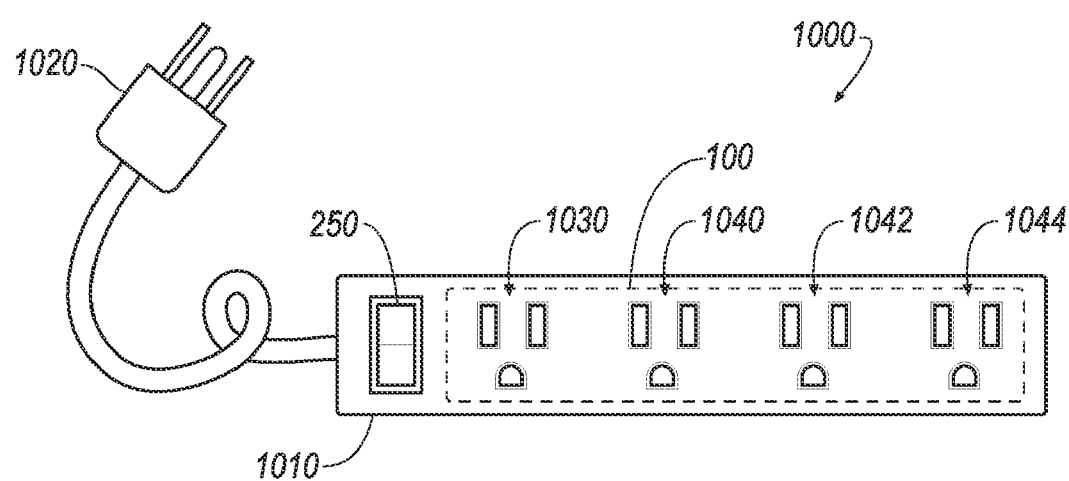
FIG. 10 is an example of a power strip including energy saving features.

FIG. 10 is an example of a power strip 1000 that includes an alternative energy saving device. A configuration similar to a "power strip" 1010 is shown having a power source plug 1020 as an input. Outputs include a master outlet 1030 and multi-slave outlets 1040, 1042, 1044 controlled by an energy saving device that monitors master outlet 1030. However, energy saving device 1000 does not simply switch slaves 1040, 1042, 1044 based on the power consumption of master 1030. Rather, energy saving device 1000 switches all of master 1030 and slaves 1040, 1042, 1044 based on the power consumption of master 1030. The user has a manual input (e.g., user switch 170) to override the operation of energy saving device 1000 to manually switch the outlets on or off.

Moreover, as discussed herein, the energy saving device may also be built into a product for saving power. In an example, the energy saving device may be designed into the circuitry of a television to reduce power consumption. In another example, the energy saving device may be designed into a phone charger. In yet another example, the energy saving device may be designed into a standard transformer for use generally with electronics and electrical devices. Moreover, the systems and methods described herein may be used to provision power to sub-systems within larger designs and need not be located at the main power input.

By employing the examples of energy saving devices as described herein, energy loss from phantom loads may be reduced significantly. For example, a television that includes a cathode ray tube (CRT) with a transformer-based power supply may consume around 120 Watts when active. When inactive (e.g., in a standby mode) the idle power consumption may be around 8 Watts of phantom load. When using the energy saving devices as described herein, power savings from phantom loads may be around 66% which is a direct function of the active duty cycle percentage as described above with respect to FIGS. 3 and 4. Thus, the power consumed by the television when an energy saving device is employed may be around 2.6 Watts at idle. The difference from an always-connected idle condition (8 Watts) is about 5.4 Watts of saved power. Other devices may include, for example a laptop computer power supply which at standby consumes about 3 Watts of phantom load. Another example is a desktop computer that consumes about 8 Watts at idle.

Examples of the threshold as discussed herein to determine the load is "active" or "inactive" state are discussed in detail above and in particular with FIGS. 3, 4, 7, and 8. In the example of a CRT television, the inactive state demands about 8 Watts and the active state demands about 120 Watts. The threshold may then be safely set anywhere between 8 Watts and 120 Watts. However, a margin of error may be factored in to allow the threshold to be used with a multitude of CRT televisions or to account for manufacturing variations that could shift the inactive and active power demand. Thus, a safe threshold value may be set at 64 Watts, which is the midpoint between the active and inactive power demand values. In another example, a laptop computer power supply demands around 3 Watts while inactive and about 26 Watts when active. Thus, a safe threshold value may be set at 14.5 Watts. In another example, a desktop computer power supply demands around 8 Watts while inactive and about 120 Watts when active. Thus, a safe threshold value may be set at 64 Watts. Of note is that while the power demand values are discussed in watts, as well as the threshold in the instant case, the actual threshold value used depends upon the methodology used to determine the load demand which may include current measurement, power measurement, or voltage measurement. One of ordinary skill in the art will recognize that the threshold value may be adapted to the particular load demand measurement employed.

It is noted that the above examples are not indicative of any particular load and should not be used in any way to limit this disclosure. Indeed, televisions, laptop computer power supplies, and desktop computers, are only some examples of load types that may be employed using the load control method including an energy saving device. Moreover, each load discussed herein is used as an example of how to employ an energy saving device. The loads may have wide ranges of active demands and inactive demands based on their technology, manufacture, intended use, and other conditions. Thus, the loads, and in particular, threshold values discussed do not translate to limiting values and are only exemplary.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. The embodiments should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

With regard to the processes, methods, heuristics, etc. described herein, it should be understood that although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for illustrating certain embodiments and should in no way be construed to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A method for conserving energy use of a load, comprising:
providing a controller continuously powered by a power source input;
providing a load switch selectively activated by the controller to provide power from the power source input to the load;
by the controller at an activate load step, providing power to the load by the load switch at an activation time, the load having an active state and an inactive state;
by the controller, maintaining power to the load during a predetermined stabilization period after the activate load step and after the activation time;
by the controller, maintaining power to the load during a sampling window after the stabilization period;
by the controller, measuring an activation load demand of the load during the sampling window;
by the controller, after measuring the activation load demand and at a decision time, comparing the activation load demand to a first predetermined threshold;
by the controller, maintaining power to the load during an active state load active time, after comparing the activation load demand, when the measured activation load demand is greater than the first predetermined threshold;
by the controller, after comparing the activation load demand, removing power to the load when the measured activation load demand is less than the first predetermined threshold to enter an inactive state;
by the controller, after removing power to the load and in the inactive state, maintaining the load as un-powered for a predetermined inactive time;
by the controller, after the predetermined inactive time has elapsed in the inactive state, repeating the previously recited steps starting with the activate load step;
by the controller in the active state, after maintaining power to the load, monitoring the load demand and removing power to the load when the monitored load demand is less than a second predetermined threshold, and repeating the previously recited steps starting with the activate load step; and
by the controller, and prior to the activate load step, entering a learn state where the controller measures the activation load demand of the load in an active state and an inactive state over a predetermined amount of time determined by a learn timer; wherein after the learn timer expires the controller determines the first threshold and the second threshold.

2. The method of claim 1, further comprising:
by the controller, determining a load active consumption of the load.

3. The method of claim 2, further comprising:
by the controller, determining a load inactive consumption of the load.

4. The method of claim 3, further comprising:
by the controller, determining the first predetermined threshold using the load active consumption and the load inactive consumption.

5. The method of claim 4, further comprising:
by the controller, determining the first predetermined threshold using the load active consumption and the load inactive consumption.

6. The method of claim 5, further comprising:
by the controller, storing the first predetermined threshold.

* * * * *